(No Model.)
R. BREWSTER.
ARTIFICIAL TOOTH MOLD.
No. 503,826. Patented Aug. 22, 1893.
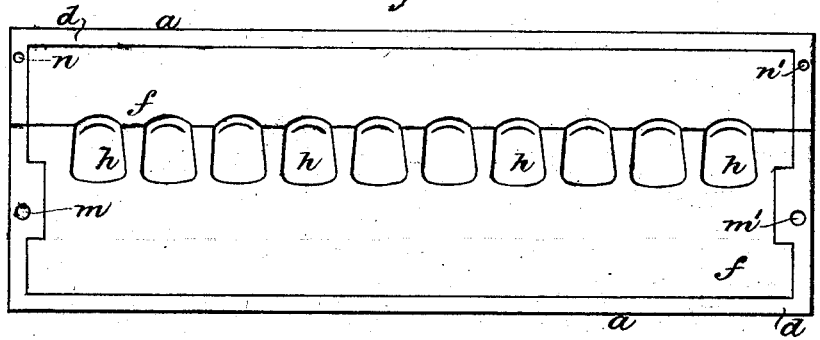
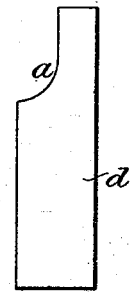
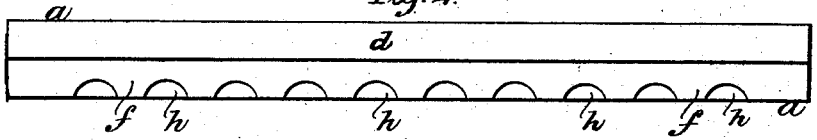
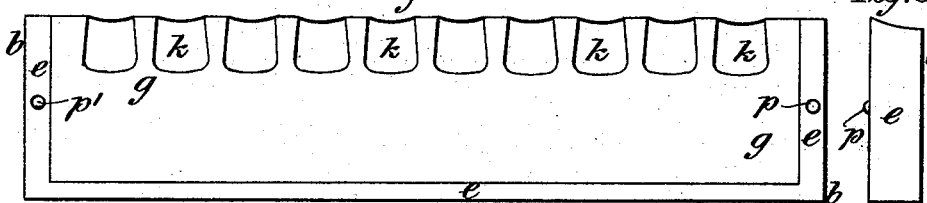
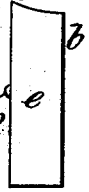
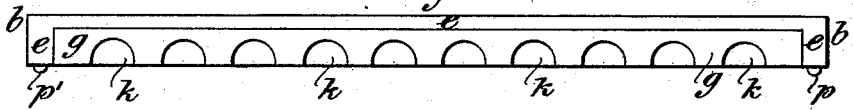
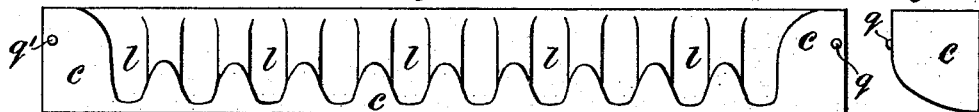
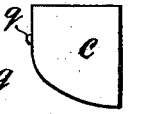
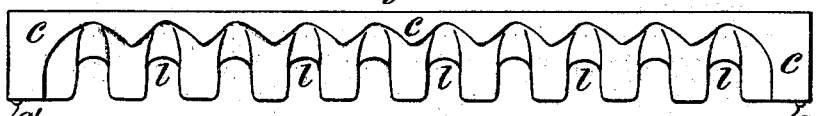
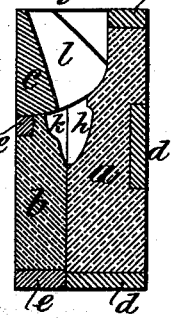
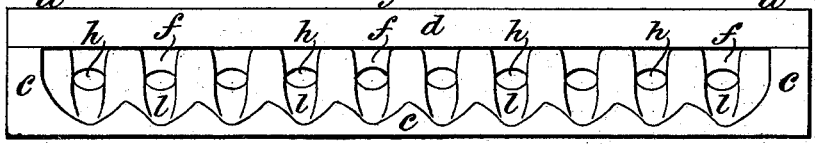
Witnesses.
B. W. Miller
Baltus L. Long
Inventor.
Robert Brewster
By his Attorneys
Baldwin Davidson Wight

UNITED STATES PATENT OFFICE.

ROBERT BREWSTER, OF NEW BARNET, ENGLAND.

ARTIFICIAL-TOOTH MOLD.

SPECIFICATION forming part of Letters Patent No. 503,826, dated August 22, 1893.

Application filed April 17, 1893. Serial No. 470,679. (No model.)

*To all whom it may concern:*

Be it known that I, ROBERT BREWSTER, manufacturer, a subject of the Queen of Great Britain, residing at Clynedale, New Barnet, in the county of Hertford, England, have invented certain new and useful Molds for Artificial Teeth, of which the following is a specification.

The object of my invention is to construct molds for the manufacture of mineral teeth of a material that will take an accurate impression of the object to be molded, that will have a certain degree of absorptive power, that will retain its shape and hardness, and be capable of constant use without frequent removal. For this purpose, I employ either Portland, Roman, or other like hydraulic cement, and I make the mold of hydraulic cement in sections which may be readily put together and taken apart.

In the accompanying drawings illustrating my invention,—Figure 1 is a plan, and Fig. 2 is a transverse section of my improved mold. The mold is made in three parts, $a$, $b$ and $c$. Fig. 3 is an elevation of the inside of the part $a$. Fig. 4 is a plan of the same, and Fig. 5 is a side view thereof. Fig. 6 is an elevation of the inside of the part $b$. Fig. 7 is a plan of the same, and Fig. 8 is a side view thereof. Fig. 9 is an elevation of the inside of the part $c$. Fig. 10 is a plan of the same, and Fig. 11 is a side view thereof.

The parts of the mold $a$ and $b$ consist of the metal frames $d$ and $e$, containing cement $f$ and $g$, in which a series of cavities $h$ and $k$ are formed. The part $c$ is made of metal and has a series of channels $l$, which guide the liquid material to the cavities $h$ and $k$. The frame $d$ of the section $a$ of the mold has holes $m$ $m'$ and $n$ $n'$ to receive pins $p$ $p'$, and $q$ $q'$, in the frame $e$ of the part $b$, and the section $c$ respectively. When the mold is ready for use, the parts $a$, $b$ and $c$ are put together, as shown in Figs. 1 and 2, and the fluid material of which the teeth are to be made, is poured into the mold through the channels $l$ and when set is removed from the mold and fired.

To produce what is known as "flat" or "plate" teeth, I make a frame of metal or wood, and stand this upon a flat piece of metal, upon which I lay the teeth to be copied, with their faces upward, securing them in position with some adhesive material. I then pour the cement over them until the frame is full. When sufficiently set, the cement is removed with its frame attached and allowed to harden. This forms the face half of the mold; the other half of the mold contains the platinum or other pins to be baked into the teeth, and holes for this purpose must be made in the cement, or a bar of metal which is drilled to receive the pins may be inserted into the frame, and the cement poured around it. The absorptive surface of the cement will then be in contact with both the front and back portions of the teeth.

As it is not necessary for the beveled portion of the mold, through which the material first passes, to have any absorptive character, this may be coated with a water-proof varnish or lined with thin metal.

In the production of teeth having shoulders or projections extending backward and known as vulcanite teeth, or crowns, the front half of the mold must be first made as described, and when dried, the reverse taken with the patterns in position so that the two halves fit accurately; the same applies to the teeth known as diatoric teeth, the necessary procedure being readily understood by any one skilled in this art. A mold so formed of Portland cement, or other hydraulic cement, absorbs moisture with sufficient rapidity from the fluid material of which the teeth are formed, and the teeth do not adhere to it and consequently no portion of their surface is caused to flake away. They remain uninjured and the molds last for a great length of time. The molds also require but little cleaning. It is quite sufficient to brush them after each operation with a soft brush moistened with water.

I claim as my invention—

1. A mold for the manufacture of artificial teeth having its operative faces formed of hydraulic cement, such as Portland cement or Roman cement.

2. A mold for the manufacture of artificial teeth comprising the parts *a*, *b* and *c*, the parts *a* and *b* comprising frames containing blocks of hydraulic cement, such as Portland
5 or Roman cement, formed with cavities, as described, the part *a* being prolonged upward to form one side of the funnels leading to the cavities, the part *c* forming the other side of the funnel and resting upon the top of the part *b*, substantially as described.

ROBERT BREWSTER.

Witnesses:
 ALFRED SHILLING,
  *Stockbury Works, New Barnet.*
 WILLIAM MURCH,
  397 *City Road, E. C.*